US007945582B2

(12) United States Patent
Ubalde et al.

(10) Patent No.: US 7,945,582 B2
(45) Date of Patent: May 17, 2011

(54) WEB-BASED INTERACTIVE GEOGRAPHIC INFORMATION SYSTEMS MAPPING ANALYSIS AND METHODS OF USING THEREOF

(75) Inventors: Anatalio Ubalde, San Francisco, CA (US); Pablo Monzon, San Francisco, CA (US)

(73) Assignee: GIS Planning, Inc., San Francicso, CA (US)

( * ) Notice: Subject to any disclaimer, the term of this patent is extended or adjusted under 35 U.S.C. 154(b) by 577 days.

(21) Appl. No.: 11/903,832

(22) Filed: Sep. 24, 2007

(65) Prior Publication Data
US 2008/0140628 A1 Jun. 12, 2008

Related U.S. Application Data

(60) Provisional application No. 60/846,494, filed on Sep. 23, 2006.

(51) Int. Cl.
*G06F 7/00* (2006.01)
*G06F 17/30* (2006.01)
(52) U.S. Cl. .................. 707/770; 707/805; 701/207
(58) Field of Classification Search .......... 707/1–10, 707/100–104.1, 200–206, 600–831; 701/207–209, 701/212; 705/7; 709/217; 715/273
See application file for complete search history.

(56) References Cited

U.S. PATENT DOCUMENTS

| 6,236,975 | B1 * | 5/2001 | Boe et al. ................... 705/7 |
| 6,324,538 | B1 | 11/2001 | Wesinger, Jr. et al. |
| 6,601,057 | B1 * | 7/2003 | Underwood et al. ........... 707/1 |
| 6,735,568 | B1 | 5/2004 | Buckwalter et al. |
| 6,850,940 | B2 | 2/2005 | Wesinger, Jr. et al. |
| 6,970,929 | B2 * | 11/2005 | Bae et al. ................. 709/226 |
| 7,028,034 | B2 | 4/2006 | Wesinger, Jr. et al. |
| 7,152,207 | B1 * | 12/2006 | Underwood et al. ......... 715/207 |
| 7,269,591 | B2 | 9/2007 | Wesinger, Jr. et al. |
| 2006/0075442 | A1 * | 4/2006 | Meadow .................... 725/91 |
| 2008/0064019 | A1 | 3/2008 | Kaufman et al. |

OTHER PUBLICATIONS

Jakob et al., DCbot: exploring the Web as value-added service for location-based applications, Apr. 5-8, 2005, IEEE, 2 pages.*
Fang Ju Wang et al., Integrating multiple Web-based geographic information systems, Aug. 6, 2002, IEEE, vol. 6, 49-61.*

* cited by examiner

*Primary Examiner* — Jean B Fleurantin
(74) *Attorney, Agent, or Firm* — DLA Piper LLP (US)

(57) ABSTRACT

A method, system, and computer-readable medium for providing geographic information systems (GIS) data is provided. The steps, functions, and instructions provided include receiving GIS data from a plurality of websites, populating a searchable database with the GIS data, and generating a search-specific electronic summary of GIS data. A method and system for networking users of a GIS data management system is also provided. The steps and functions provided by this method and system include populating a searchable database with GIS data received from a plurality of websites and providing a networking interface interoperable with the database such that users of the GIS data management system are networked according to GIS data queries.

19 Claims, 17 Drawing Sheets

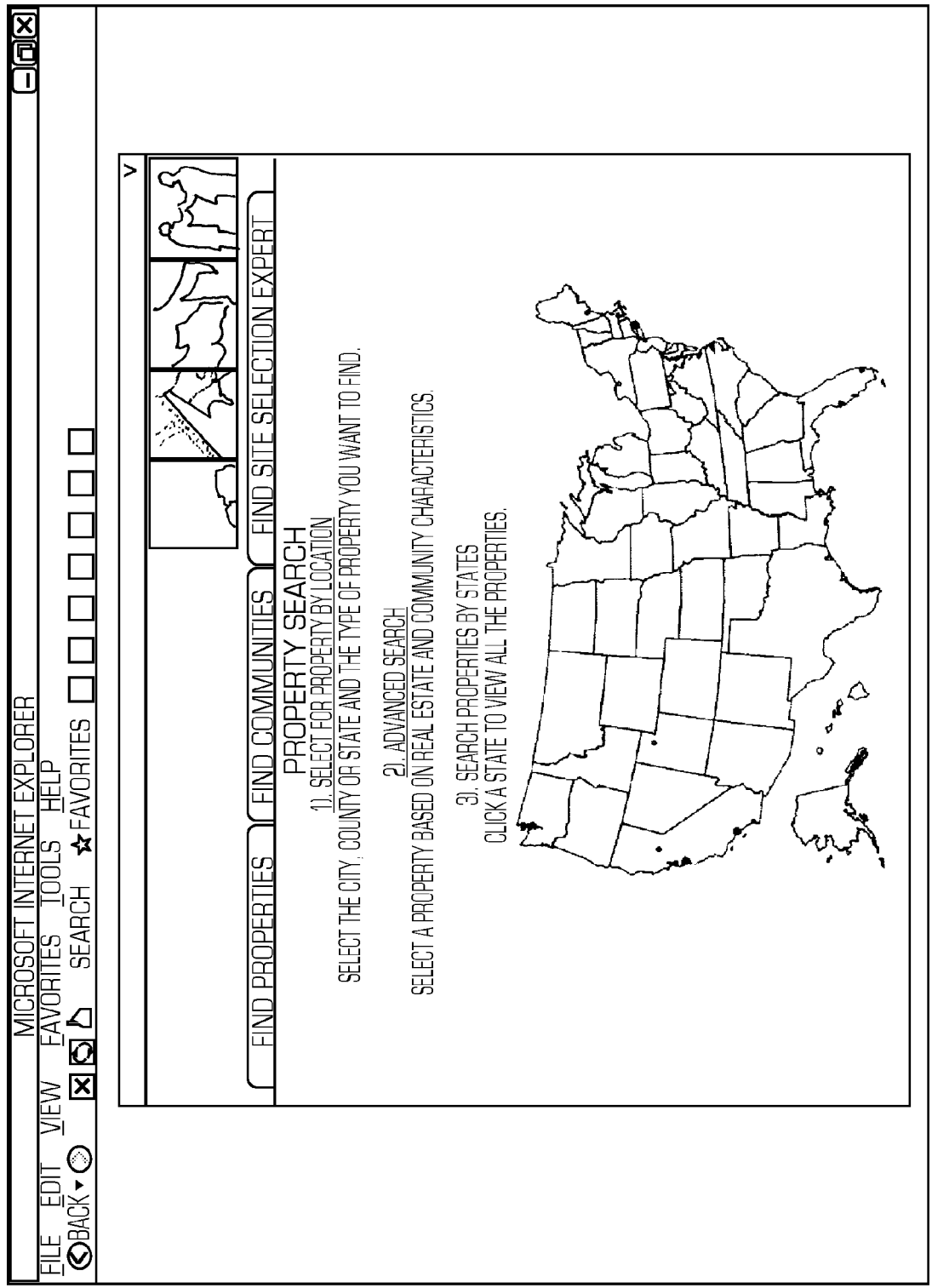

FIG. 4A

PROPERTY SEARCH

CLICK HERE TO START A NEW SEARCH 1 2 3 4 5 6 7 8 9 10...

| ADDRESS | COMMUNITY | STATE | | TYPE OF PROPERTY | | LEASE | SALE |
|---|---|---|---|---|---|---|---|
| KLINDT DR | PUYALLUP | WA | VIEW | RETAIL | YES | 59,350 | 59,350 |
| #26-1502 HWY 157 N | WASCO | OR | VIEW | VACANT LAND | NO | 37,462 | 101,495 |
| (OLD) ECKERDA | MANSFIELD | TX | VIEW | INDUSTRIAL/WAREHOUSE | NO | 3,008 | 48,000 |
| 0 ADMIRAL PL | OKLAHOMA CITY | OK | VIEW | RETAIL | YES | 10,808 | 10,808 |
| 0 CROCKER RD | FERNDALE | WA | VIEW | INDUSTRIAL | YES | 20,000 | 20,000 |
| 0 ROUTE 83 & I-90 | WESTLAKE | OH | VIEW | OFFICE | YES | 90,000 | 90,000 |
| 0 ROUTE 83 & I-90 | AVON | OH | VIEW | OFFICE | YES | 2,500 | 100,000 |
| 0 ROUTE 83 & I-90 | AVON | OH | VIEW | OFFICE | YES | 10,000 | 10,000 |
| 000 APPLE BLOSSOM DR | AVON | OH | VIEW | OFFICE | YES | 2,500 | 100,000 |
| 0621 SIX FLAGS DR | CHELAN | WA | VIEW | RETAIL | YES | 19,600 | 19,600 |
| 0623 107TH ST | ARLINGTON | TX | VIEW | OFFICE | YES | 50,000 | 103,000 |
| 0625 107TH ST | ARLINGTON | TX | VIEW | INDUSTRIAL/WAREHOUSE | NO | 30,000 | 30,000 |
| 0625 107TH ST | ARLINGTON | TX | VIEW | INDUSTRIAL/WAREHOUSE | YES | 60,000 | 60,000 |
| 0625 107TH ST | ARLINGTON | TX | VIEW | RETAIL | NO | 60,000 | 60,000 |
| 0628 112TH ST | ARLINGTON | TX | VIEW | INDUSTRIAL/WAREHOUSE | NO | 30,000 | 30,000 |
| 0626 112TH ST | ARLINGTON | TX | VIEW | INDUSTRIAL/WAREHOUSE | YES | 17,400 | 17,400 |
| 0626 112TH ST | ARLINGTON | TX | VIEW | INDUSTRIAL/WAREHOUSE | YES | 17,400 | 17,400 |
| 0700 HIGHLANDER BLVD | ARLINGTON | TX | VIEW | OFFICE | YES | 8,000 | 28,000 |
| 0709 STADIUM DR | ARLINGTON | TX | VIEW | OFFICE | NO | 15,000 | 39,267 |
| 0912 13TH ST | ARLINGTON | TX | VIEW | INDUSTRIAL/WAREHOUSE | YES | 79,735 | 79,735 |
| 0915 W MAYFIELD RD | ARLINGTON | TX | VIEW | INDUSTRIAL/WAREHOUSE | YES | 11,707 | 35,151 |

FIG. 6B

SEARCH FOR SITE SELECTORS

ENTER SEARCH CRITERIA
SPECIALTY: MANAGEMENT CONSULTING
NAME:

INDUSTRY: <CLICK HERE TO SELECT>
CITY: _____ STATE: __

SEARCH

TOTAL RECORDS: 8

| NAME | EMPLOYER | CITY | STATE | PHONE |
|---|---|---|---|---|
| KENNETH BOLAND | KPMG PEAT MERWICK LLP | MONTVALE | NJ | 201-307-7838 |
| PETER BROOKS | ERNST & YOUNG LLP | NEW YORK | NY | 213-773-4975 |
| GENE DUPONT | IBM GLOBAL LOCATION STRATEGIES | FLORHAM PARK | NJ | 973-725-4521 |
| BOB FREDERICKSON | IBM GOLBAL LOCATION STRATEGIES | FLORHAM PARK | NJ | |
| PATRICK GAMMONS | DELOITE & TOUCHE, LLP/FAILURE CONSULTING | CLEVELAND | OH | 218-600-1300 |
| EDWARD MONTGOMERY | ERNST & YOUNG LLP | DALLAS | TX | 214-869-8030 |
| CHRISTINE O'CONNOR | RIGHT MANAGEMENT CONSULTANTS INC | PHILADELPHIA | PA | 215-972-7277 |
| SAMUEL SILVETRY | DELOITE & TOUCHE LLP | PHILADELPHIA | PA | 215-348-2308 |

602

WEB-BASED INTERACTIVE GEOGRAPHIC INFORMATION SYSTEMS MAPPING ANALYSIS AND METHODS OF USING THEREOF

PRIORITY

This application claims the benefit of priority to U.S. provisional patent application No. 60/846,494, filed Sep. 23, 2006, which is hereby incorporated by reference.

FIELD OF THE INVENTION

The present invention relates to web-based geographic information systems. The invention further relates to an interactive geographic information systems mapping analysis tool useful for economic development, corporate real estate, and other related industries. The invention further relates to methods of using thereof.

BACKGROUND OF THE INVENTION

The Internet has significantly changed the world in many aspects. For instance, like other industries, the economic development industry has become a big beneficiary of the growth of the Internet. Economic development and public policy professionals' effective participation in the information age is a necessity. In order to be effective, these professionals need technology tools which deliver value and insight.

Not surprisingly, there are websites available for providing various features: websites that allow users to search for available sites or properties; websites that provide demographic data to users; and websites that provide business mapping. None of those websites, however, integrate all of these features into one website with local and national geographic information systems (hereinafter "GIS") data from multiple government sources and organizations.

Organizations and professionals not using online GIS find themselves at a competitive disadvantage when they are trying to create, grow, attract or retain businesses. Economic development organizations, municipalities, regions, and States are in dire need of marketing themselves to expanding and relocating businesses via an interactive Internet GIS to provide site-specific and detailed demographic and industry information. To this end, there is as ever increasing need for one portal website that would integrate local websites which have additional and detailed local GIS data, multiple organizations' local real estate, demographic, business database, and GIS into an integrated, portal website.

In addition, there is a need for a method of using the website for searching communities based on community and geographic characteristics. The related art does not disclose or suggest integration of all of those features disclosed therein in one portal website having local GIS data from multiple sources such as government sources. There is, therefore, substantial interest in the creation of a website which links to local websites for local demographic and business information, and provides such data to website users.

SUMMARY OF THE INVENTION

The present invention solves the aforementioned problems by providing an interactive web-based GIS method, system and computer-readable medium.

In one embodiment, a method for providing GIS data is disclosed. Within such embodiment, the step of receiving GIS data from a plurality of websites is provided. The method further includes the step of populating a searchable database with GIS data and the step of generating a search-specific electronic summary of GIS data.

In another embodiment, a system for providing GIS data is disclosed. The system includes a server connected to a computer network and a data management application executing in association with the server to provide a set of functions. Within such embodiment, the function of receiving GIS data from a plurality of websites is provided. Other functions provided by the system include the function of integrating the GIS data onto a searchable database and the function of displaying a search-specific electronic summary of GIS data.

In another embodiment, a computer-readable medium for providing GIS data is also disclosed. Within such embodiment, the computer-readable medium has computer executable instructions, which includes the step of integrating GIS data received from a plurality of websites onto a searchable database and the step of generating a search-specific electronic summary of GIS data.

In yet another embodiment, a method for networking users of a GIS data management system is provided. Within such embodiment, the method includes the step of populating a searchable database with GIS data received from a plurality of websites and the step of providing a networking interface interoperable with the database such that users of the GIS data management system are networked according to GIS data queries.

A system embodiment for networking users of a GIS data management system is also provided. Within such embodiment, a server is connected to a computer network and a data management application executing in association with the server to provide various functions. The system functions include the function of integrating GIS data received from a plurality of websites onto a searchable database and the function of providing a portal which allows users of the GIS data management system to be networked according to particular GIS data queries.

As will be appreciated upon consideration of the following detailed description of the invention and accompanying drawings, there are many advantages and features of the present invention, which in turn lead to many new and useful applications of the invention.

BRIEF DESCRIPTION OF THE DRAWINGS

The present invention can be more fully understood from the following detailed description and the accompanying drawings which form a part of this application.

FIGS. 3A and 3B depict webpages providing options for searching properties and allowing a user to select the community type, state, type of a property, size of a property, and lease/sale status according to embodiments and of the present invention, respectively.

FIG. 4A depicts a webpage displaying properties matching the search criteria of a user according to one embodiment of the present invention

FIG. 6B depicts a webpage permitting a user to perform another search or view matching site selection professionals according to one embodiment of the present invention.

DETAILED DESCRIPTION OF THE DRAWINGS

As described in greater detail below, applicants have invented a web-based interactive GIS mapping analysis and methods of using thereof. By way of example, but not by way of limitation, applicants disclose the following inventions.

Figure 1:
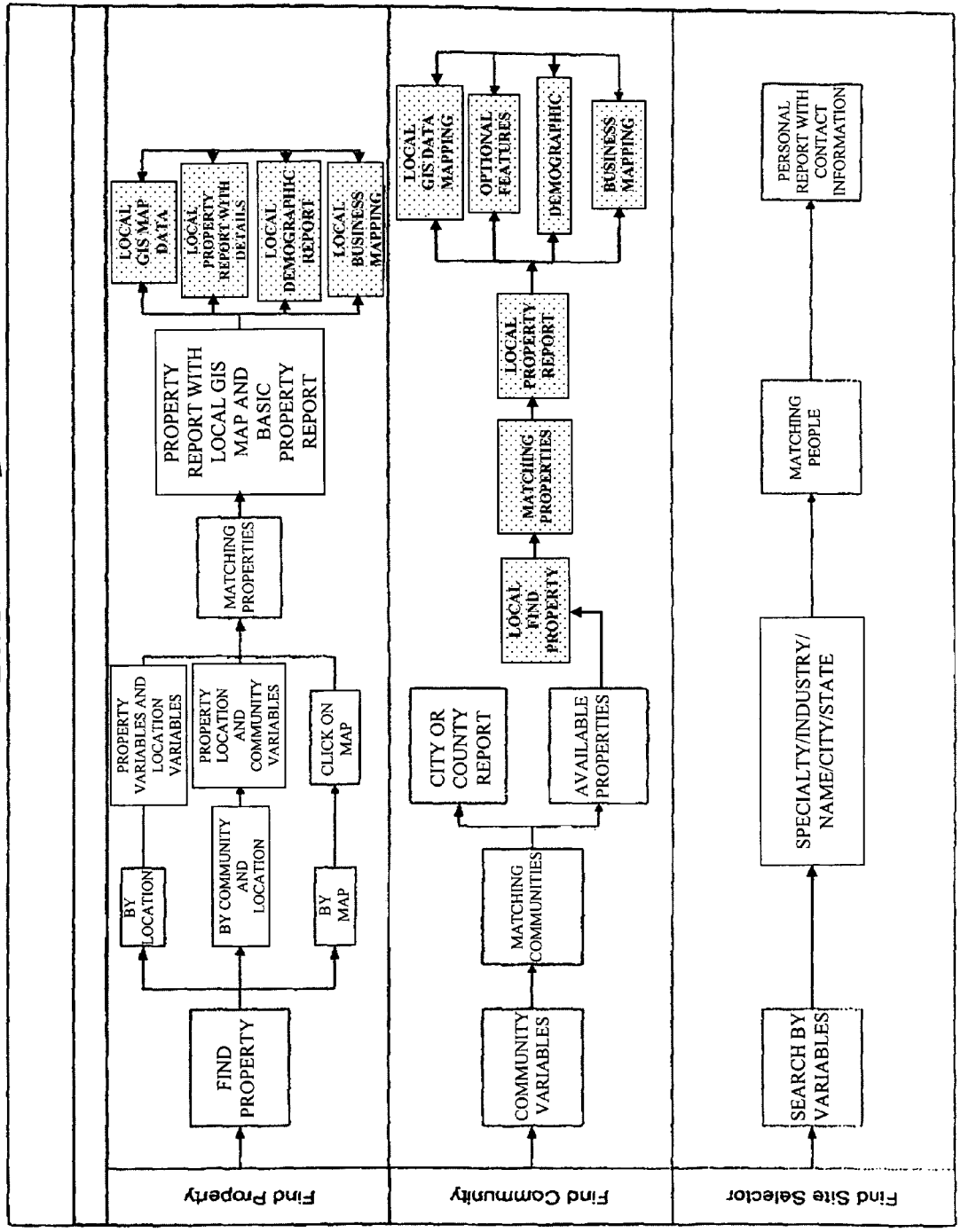
FIG. 1 is a block diagram illustrating an overview chart according to the present invention.

The present invention provides a website that allows website visitors to perform searches for available real estate and conduct site selection analysis using GIS and data. The present invention encompasses, but is not limited to: (1) a website that allows website visitors to perform searches for available properties using GIS and data; (2) a website that allows website visitors to conduct site selection analysis using GIS and data; (3) a website that provides multiple organizations' local real estate, demographic, business data, and GIS into an integrated website (e.g., a website that provides demographic data obtained from a national demographic data source, while also providing business data obtained from either a local website and/or from a national data vendor); (4) a website that allows website users to search for available properties based on property or community characteristics; (5) a website that allows for users to access the interactive local GIS information; and (6) an interactive GIS mapping technology that has applicability in the industries other than real estate and site selection analysis FIG. 1 is a block diagram 100 illustrating an overview chart according to one embodiment of the present invention. A web-based GIS mapping technology is disclosed herein. The present invention utilizes a variety of data, software, and database solutions. The invention, for instance, speeds up and simplifies the process of business attraction and site selection for new, expanding and relocating businesses. The invention performs by effectively answering main questions that users have in their site selection analysis process. Main questions, by way of example but not by way of limitation, include the following: are there available properties in your community such as vacant buildings or lots?; what are the site-specific market and demographic characteristics of a potential business location?; whether locating close to other businesses will create synergistic effect or competitions?; what incentives such as zoning regulations, infrastructure including utilities, transportation means, and/or business improvement districts are available in a location? Answers for these questions are gathered and available for the users using the present invention's interactive Internet GIS mapping technology.

The present invention provides a needed site selection analysis that businesses require in order for them to identify unique geographic advantages and business opportunities in the communities of interest. Buildings and development sites are available throughout the nation by the present invention. The present invention further provides dynamic GIS mapping capabilities including local GIS. Location/geographic specific advantages are also provided by the present invention. Those advantages are realized by leveraging the site-specific power of GIS through the Internet with the present invention.

In one embodiment, the invention provides dynamic GIS mapping capabilities including the ability to zoom in/out, move the map, identify information and turn layers of GIS information on. Much of this local GIS data is provided through partnerships and agreements with local governments because the government agencies often provide the most detailed and accurate GIS data.

Another embodiment of the present invention includes, by way of example but not by way of limitation, the following features: available property site selection query; saving selected property; property comparison; property search reports; dynamic demographic engine including dynamic demographic radius analysis and dynamic demographic drive time analysis; dynamic business industry cluster report engine including dynamic business report and dynamic mapping; locator map; map display control; map legend display control; user-defined reports in various formats including, but are not limited to, printable reports and documents, email reports, PDF format reports, MS Word® reports, and MS Excel® reports; property owner and real estate agent site and property listing database; a staff administration webpage; and a staff administration web analytics.

The available property site selection query allows website users to search for available commercial property based on user defined information such as size and a type of use. This tool gives a user the ability to identify and select available land or buildings in the project geography based on given criteria such as size and a type of a space including office, retail, industrial, and vacant land of space. As a result of this search the computer compiles a list of locations which match the characteristics and display them to the user. These properties are viewable in a text-list format and through the map interface. The user has the opportunity to compare these properties in a side-by-side format, save a subset of these matching properties, and drill down to get additional information about a specific property. When the user clicks on the property in which he/she is interested, the selected space is shown on the map and a property report appears with the characteristics of the space including size, use, address, description, and contact information.

The selected property save function allows website visitors to save user-selected properties from the matching properties into a saved properties folder for the user session. After a property is found through the site selection process and the user selects it, the application generates a report with the property's characteristics which can also include graphics. Web site visitors are able to select any available property in the project geography and view a map showing the location of the property. Information in the property report includes, but is not limited to, commercial property or project name, picture, address, incentive areas, daily traffic count, zoning, total site size, other tenants, available sites by type, square feet and broker, property contact information such as broker name, company, address, telephone, fax and e-mail, and other desired webpage links.

The property comparison function permits a user to generate side-by-side comparisons of either matching or selected properties. The property search reports function allows web site visitors to generate presentation-quality property reports for available properties.

The dynamic demographic engine including dynamic demographic radius analysis and dynamic demographic drive time analysis provide the following capabilities. The dynamic demographic radius analysis helps a user to generate user-defined radius demographic analysis from any location within the project geography. This application tool gives the user the capability to dynamically generate demographic reports for any location within the project geography such as the found property. Web site visitors can create demographic reports based on their own user-defined distance from a property. The map will then show a radius ring around the property corresponding to the user-defined distance. Demographic reports can include population, household, income, consumer-expenditure and workforce information. Cities located within a Metropolitan Statistical Area (MSA) can also display wage information by occupation. Through the present invention's Internet GIS this complex analysis will be generated in seconds and presented in a report format. The dynamic demographic drive time analysis permits a user to generate user-defined drive-time demographic analysis from any location within the project geography.

The dynamic business industry cluster report engine including dynamic business report and dynamic mapping provide the following: the dynamic business reports allow a user to generate user-defined business reports from any location within the project geography; and the dynamic mapping allows the user to zoom in/out, pan and identify information on the map.

The locator map permits a user to view a project geography map showing the location of the property as a point within the project geography. The map display control allows a user to turn on and off GIS layers of information. The map legend display control allows a user to view a map legend which describes the graphic elements shown on the map interface.

The user-defined reports are generated in various formats including, but are not limited to, printable reports and documents, email reports, downloadable/savable reports in Microsoft Word format, Microsoft Excel format, and PDF format. Email reports, for instance, allow a user to e-mail property, demographic, business and map reports to e-mail addresses of the user's choice.

The property owner and real estate agent site and property listing database allows a user to add, delete and update his/her properties through a user-friendly web site using a login and password system.

The staff administration webpage allows a client staff to have a complete access to the property data for addition, deletion and maintenance. The staff also uses this webpage to give real estate brokers access to the web program.

The staff administration web analytics allow client staff to measure the website usage as well as analytical metric evaluations which assist in informing appropriate economic development policy responses.

Figure 2:
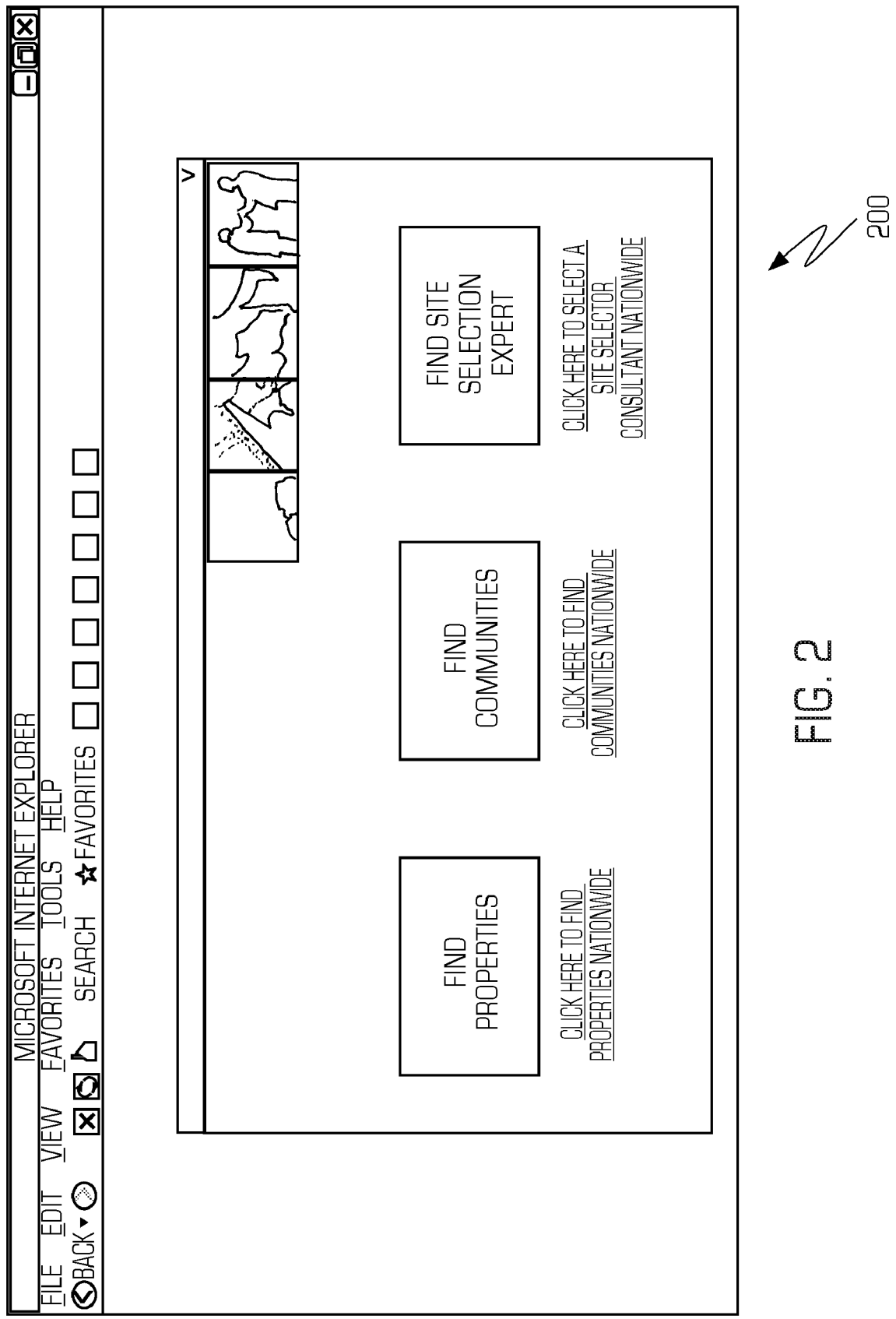
FIG. 2 depicts the product home page according to one embodiment of the present invention.

FIG. 2 depicts the product home page 200 according to one embodiment of the present invention. From the home page, a user has options he/she can select by clicking on a hyperlink provided thereon. For instance, the user selects an option that allows a search for properties by location. The invention also allows the user to search for communities by geographic characteristics. Further, the invention permits the user to search for site selection consultants and experts.

Figure 3A:
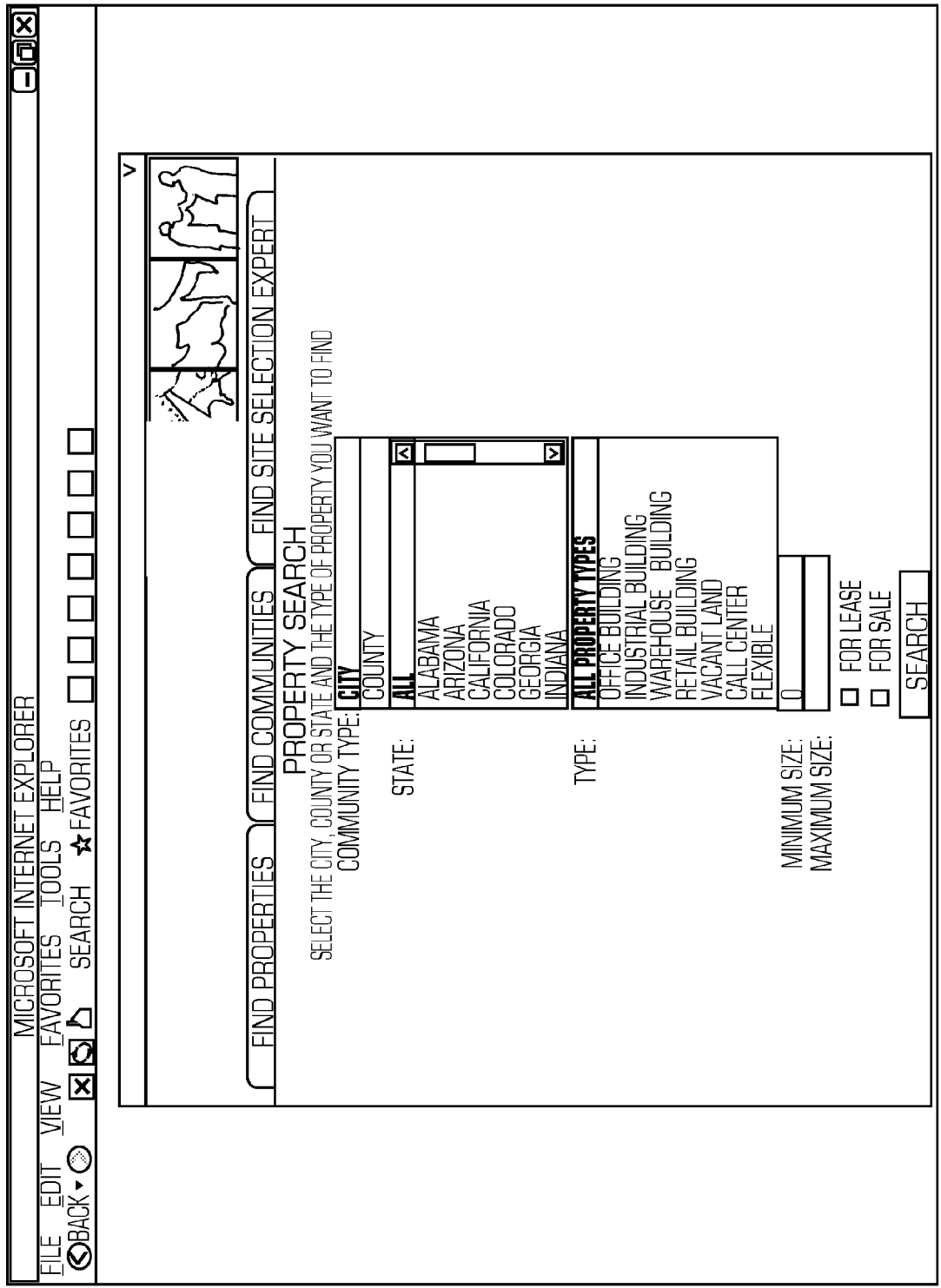

FIG. 3A depicts a webpage 300 providing three options for searching properties according to one embodiment of the present invention. A user is directed to this webpage by clicking the Find Properties option. The user then has three options to search for properties of interest: search properties by geographic location and by property characteristics; search for properties by geographic location, property characteristics, and community characteristics; and search properties by clicking on a State on the map.

FIG. 3B depicts a webpage 302 allowing a user to select a community type, a State, a type of a property, size of a property, and lease/sale status according to one embodiment of the present invention. A list of matching properties is generated according to the present invention.

In one embodiment, a webpage permitting a user to perform an advanced search as well as the basic search according to one embodiment of the present invention is disclosed. The user will be able to select a community type, a State, a type of a property, size of a property, and lease/sale status according to one embodiment of the present invention. The user is also able to select geographic characteristics of the community such as population, median age, unemployment rate, distance to a highway, labor force size, percent of people with a bachelor's degree, percent of people with a high school diploma, median household income, types of high school facilities, and access of airport transportation. A list of matching properties is generated according to the present invention.

FIG. 4A depicts a webpage 400 displaying properties matching the search criteria of a user according to one embodiment of the present invention. The webpage provides summary comparison data including addresses, communities, States, types of the properties, sale/lease status, and lot sizes.

Figure 4B:
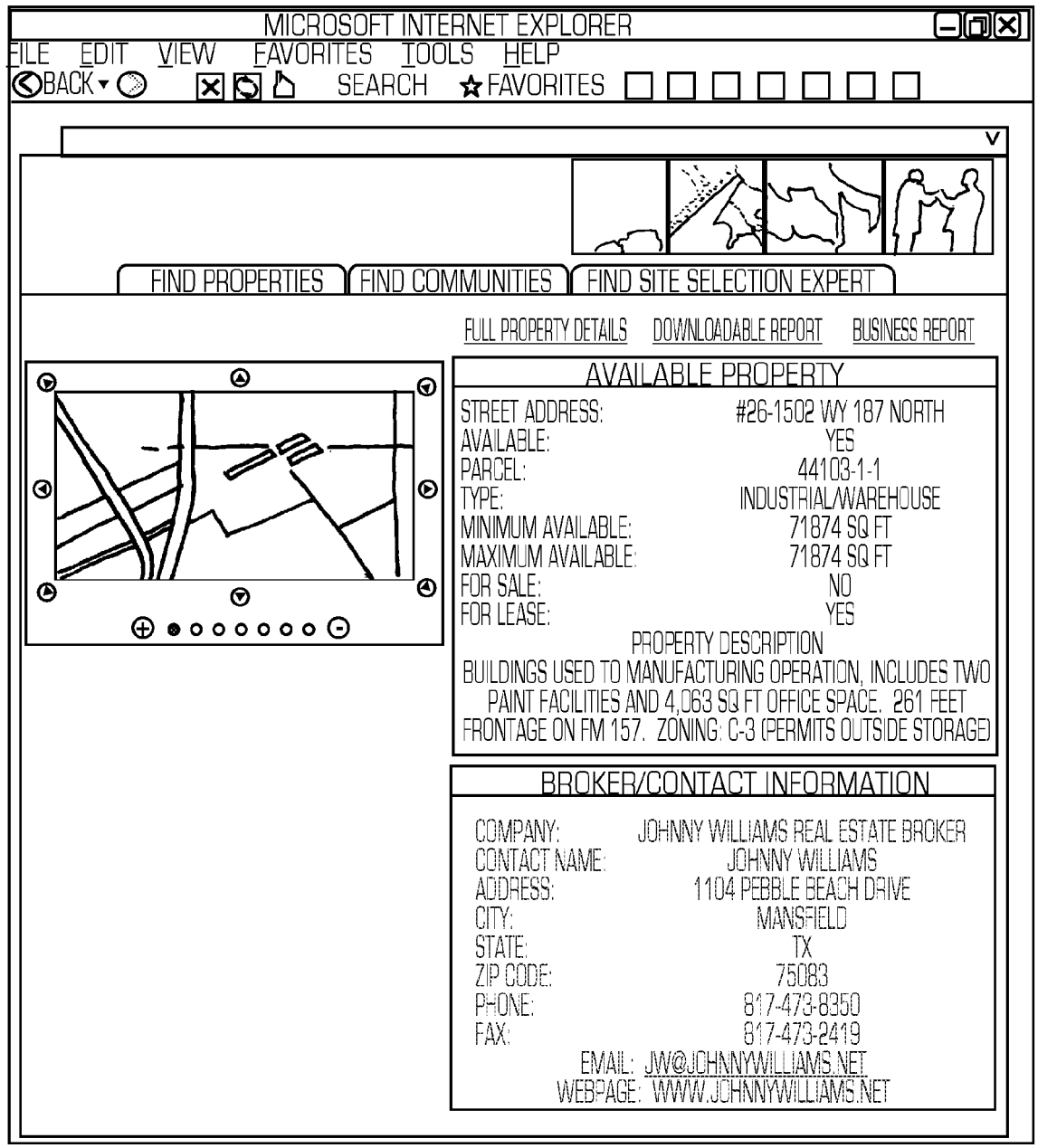
FIG. 4B depicts a webpage showing an interactive map with local GIS data, a summary of basic property report variables, and hyperlinks to a full property report or mapping analysis according to one embodiment of the present invention.

FIG. 4B depicts a webpage 402 showing an interactive map with local GIS data, a summary of basic property report variables, and hyperlinks to a full property report or mapping analysis according to one embodiment of the present invention. A property report providing the following data is generated by the present invention: an interactive map displaying local GIS data; a summary of basic property report variables including contact information for the property; hyperlinks to a full property report, demographic reports, business mapping by industry analysis.

In one embodiment, a webpage providing various options is disclosed. A user is directed to the following website options: a detailed property report; a demographic report; a business mapping by an industry report.

Figure 4C:
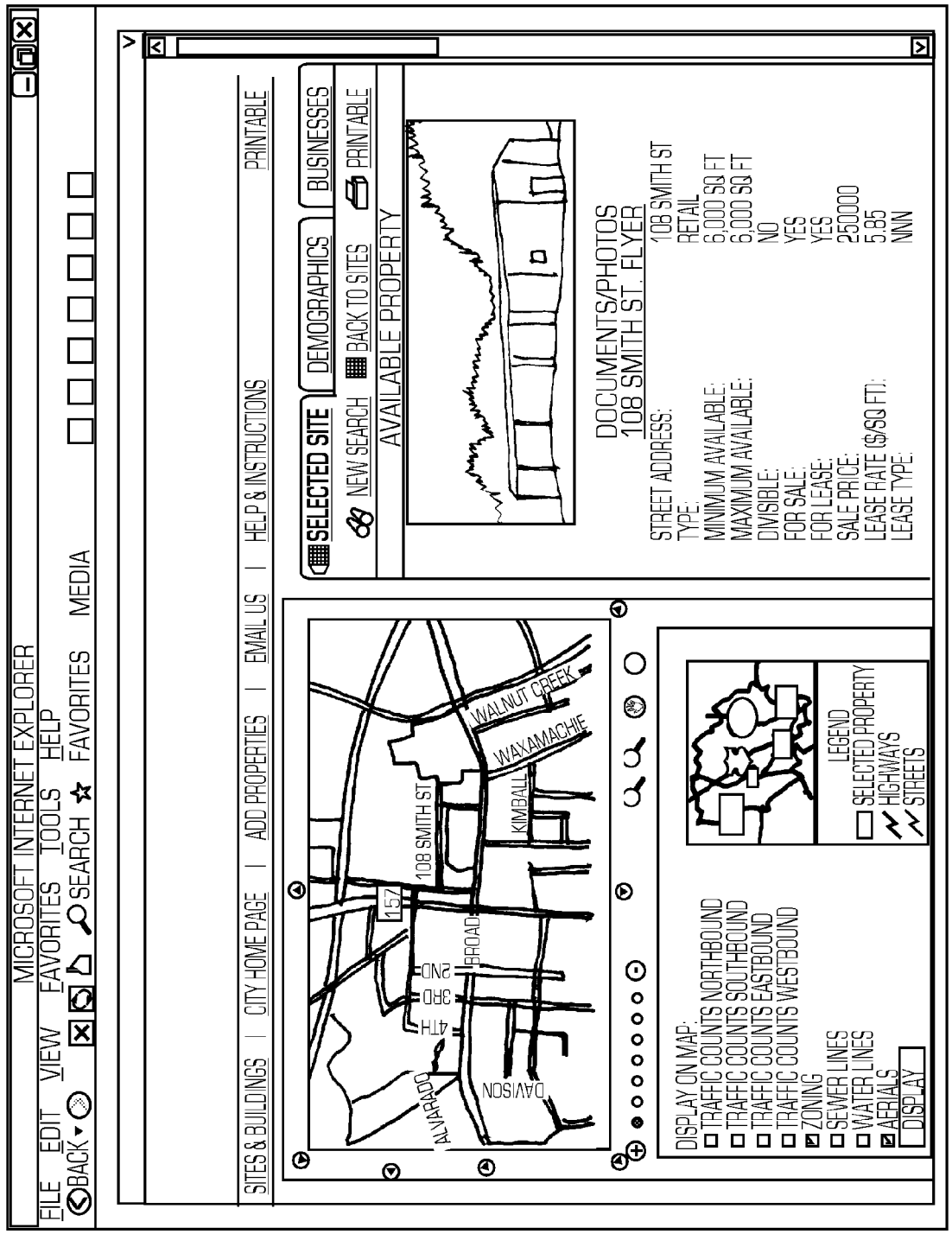
FIG. 4C depicts a local website providing multiple options according to one embodiment of the present invention.

FIG. 4C depicts a local website 404 providing multiple options according to one embodiment of the present invention. Depending upon the designs of a website a user is able to link from any of the reports and analysis tools disclosed herein to any of the other reports and analysis tools. Additionally, the user has an access to detailed, interactive GIS data and map layers.

Figure 5A:
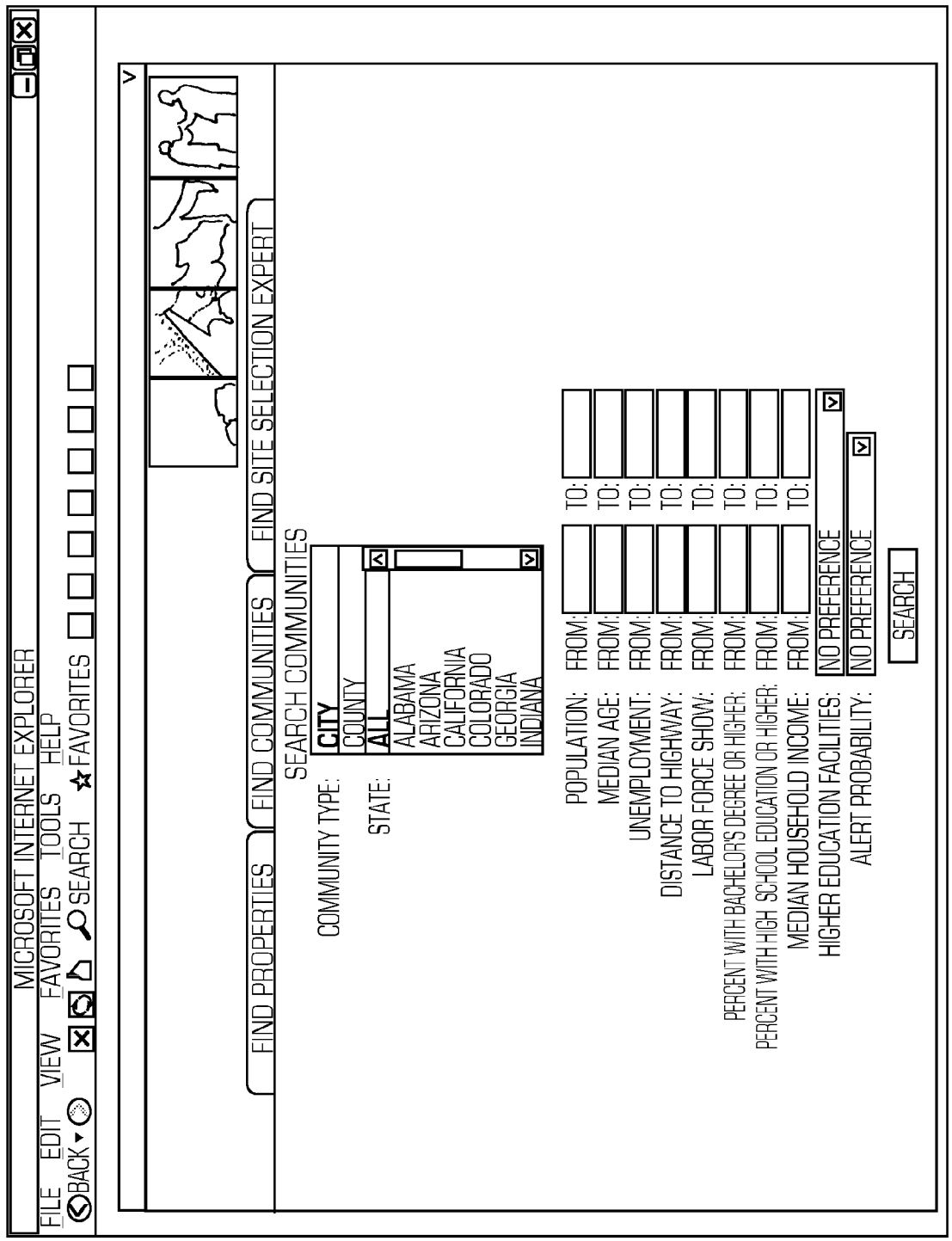
FIG. 5A depicts a webpage allowing a user to search for communities that match specific geographic, demographic or other characteristics according to one embodiment of the present invention.

FIG. 5A depicts a webpage 500 allowing a user to search for communities that match specific geographic, demographic or other characteristics according to one embodiment of the present invention. On this webpage, the user will be able to search for communities, cities or counties that match specific geographic and demographic characteristics such as population, median age, unemployment rate, distance to a highway, labor force size, percent of people with a bachelor's degree, percent of people with a high school diploma, median household income, types of high school facilities, and access of airport transportation. A list of matching communities is generated according to the present invention.

Figure 5B:
FIG. 5B depicts a webpage providing a list of cities or counties that match a user's search criteria according to one embodiment of the present invention.

FIG. 5B depicts a webpage 502 providing a list of cities or counties that match a user's search criteria according to one embodiment of the present invention. The present invention shows a side-by-side comparison of the communities population, median age, labor force size, percent of people with a bachelor's degree, percent of people with a high school diploma, and median household income. From this webpage, the user is able to view a community report having basic geographic and demographic information within the community selected.

Figure 5C:
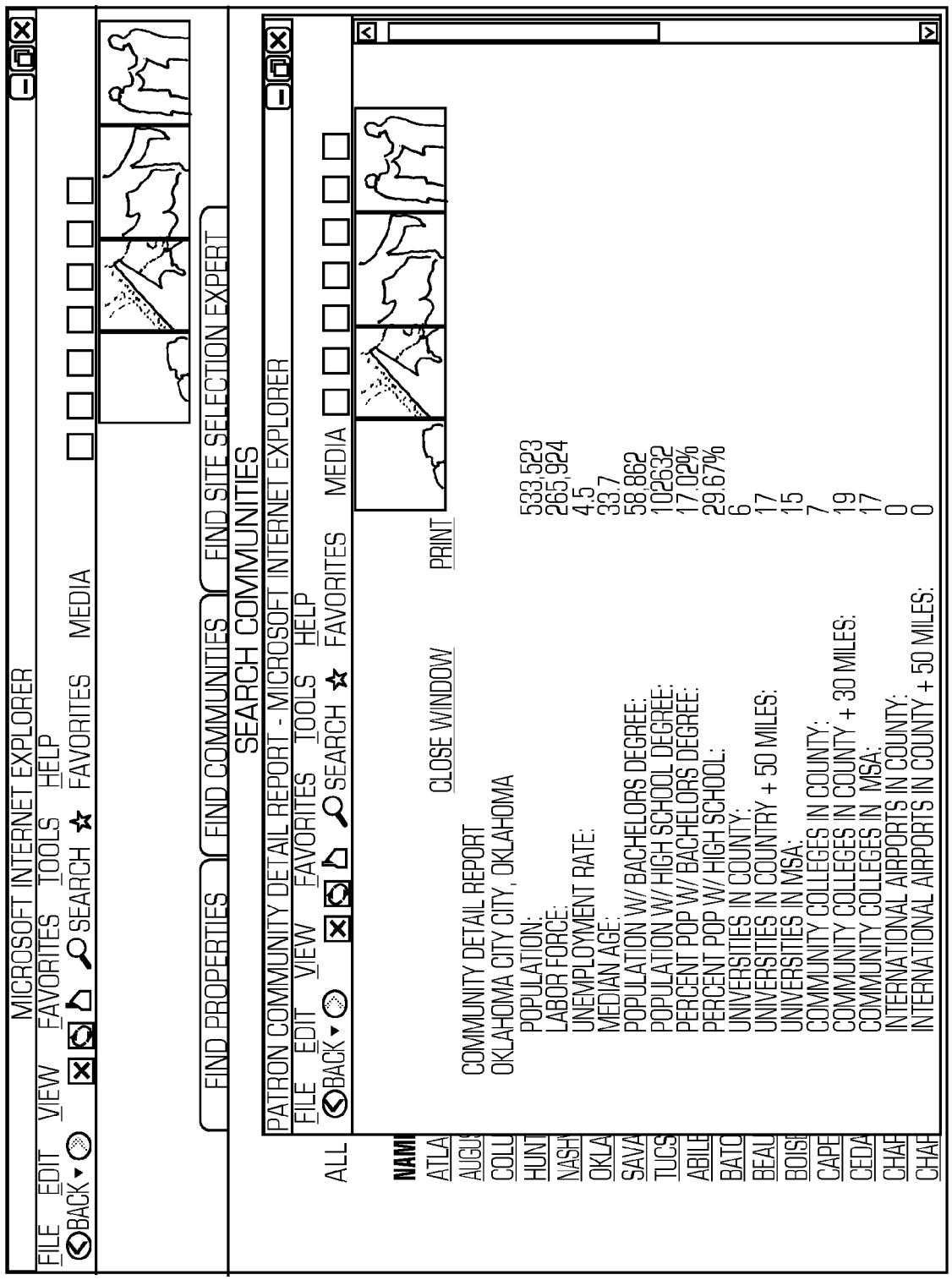
FIG. 5C depicts a webpage showing a community report generated according to one embodiment of the present invention.

FIG. 5C depicts a webpage 504 showing a community report generated according to one embodiment of the present invention. The community report generated according to the present invention includes information such as population, labor force, unemployment rate, median age, percent of people with a bachelor's degree, percent of people with a high school diploma, white collar workers, blue collar workers, young and educated workers, workers by industry, wages by industry, sole proprietors, patents, household expenditures, household income, home value, commute travel time, proximity to interstate, proximity to rail road, availability of incentive geographies, higher education institutions in a county, international airports in a county, and domestic airports in a county.

A webpage showing the property search portion according to one embodiment of the present invention is disclosed. A user will be able to search for available properties, find matching properties, view detailed property reports, view local GIS data through a interactive map, create demographic reports, map business by industry, and access to other customized features.

Figure 6A:
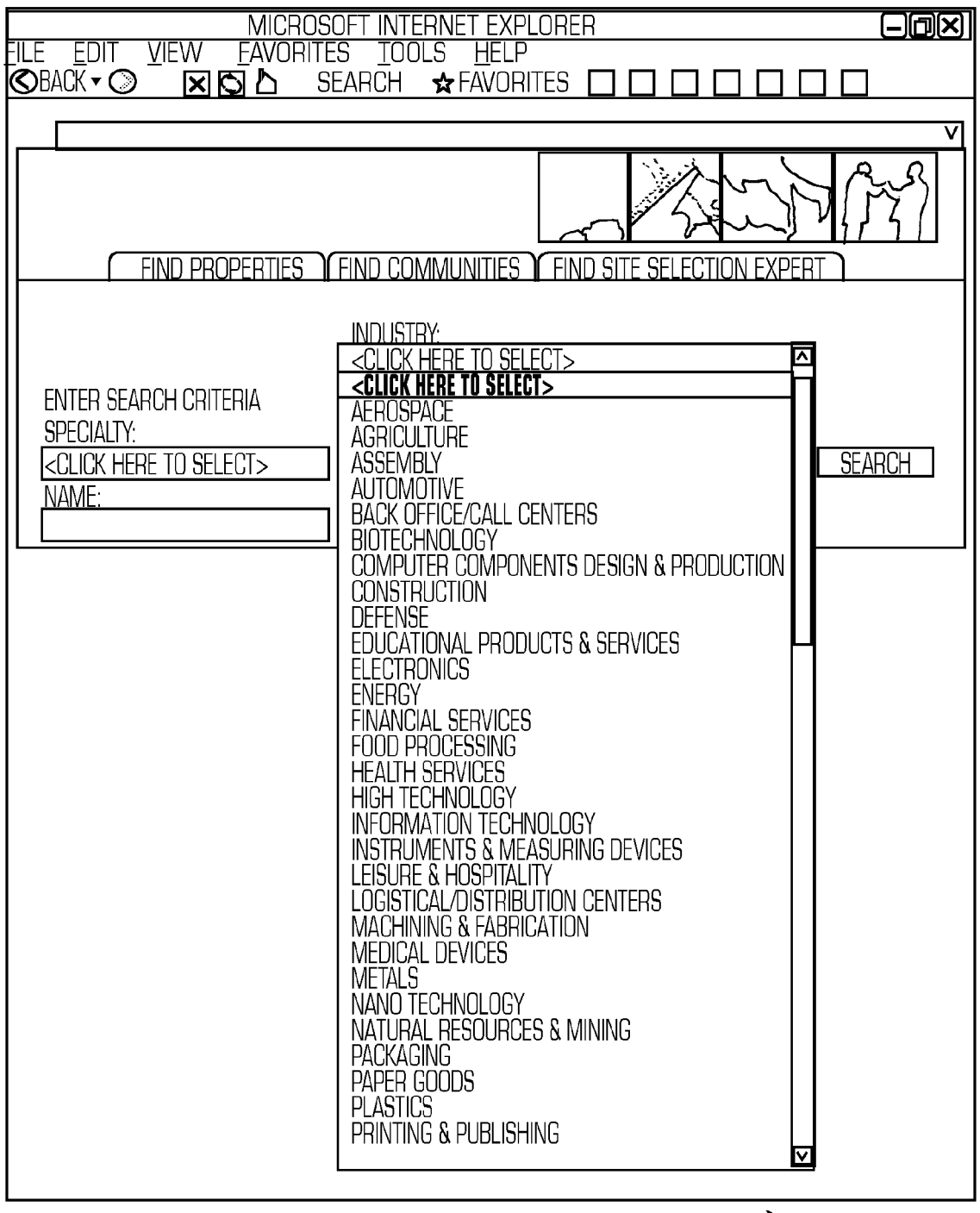
FIG. 6A depicts a webpage allowing a user to search for site selection experts according to one embodiment of the present invention.

FIG. 6A depicts a webpage 600 allowing a user to search for site selection experts according to one embodiment of the present invention. The user is able to search for site selection experts—professionals that assist a business in the process of finding a new location by a variety of characteristics. The user will be able to search by the experts' specialty, industry, name, city or State. A report of matching professionals is generated according to the present invention.

FIG. 6B depicts a webpage 602 permitting a user to perform another search or view matching site selection professionals according to one embodiment of the present invention. The user herein will be able to get more information regarding site selection experts/professionals. In this regard, the user is able to click a hyperlink that provides more information for each site selection expert/professional.

Figure 6C:
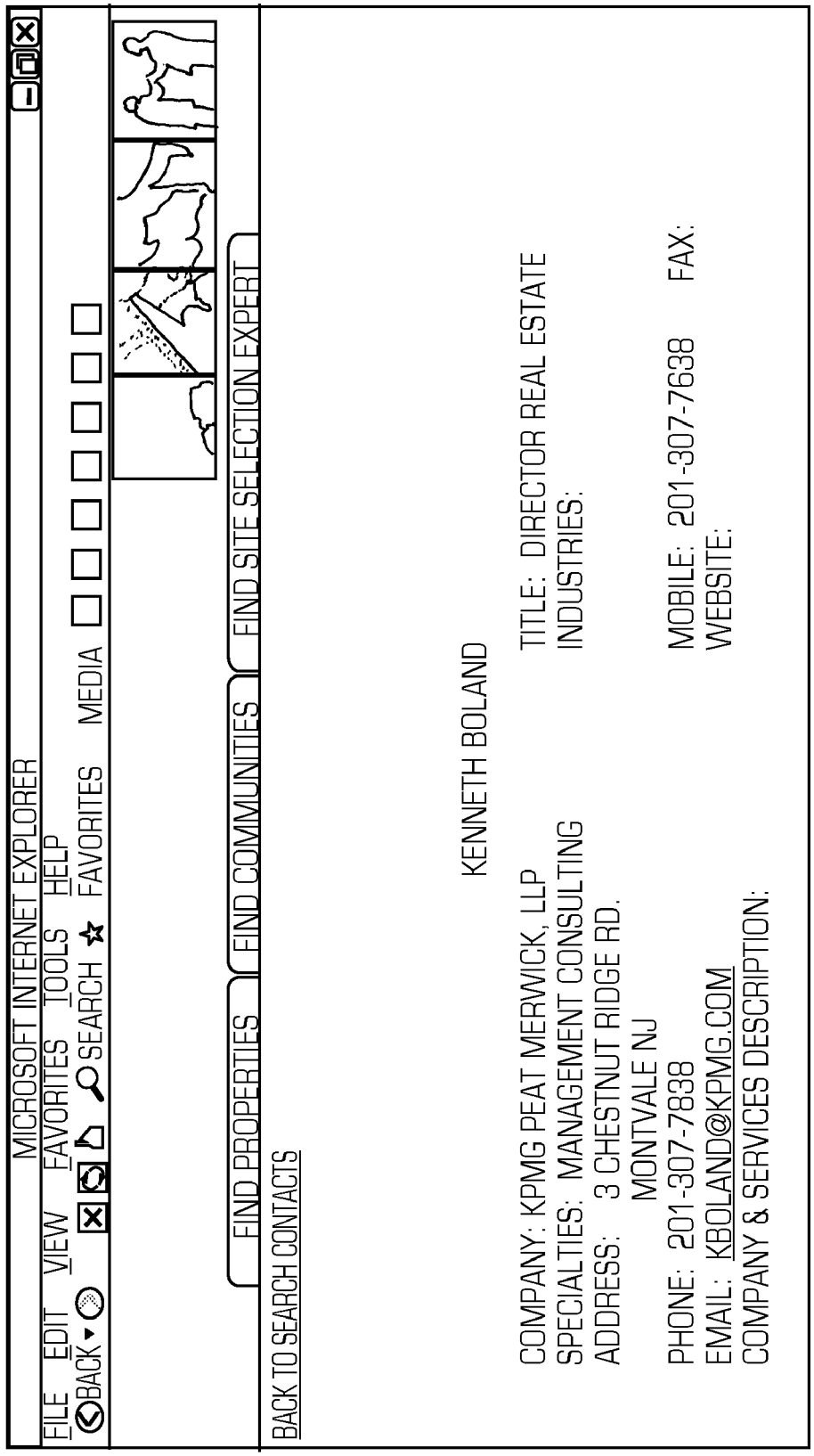
FIG. 6C depicts a webpage showing more detailed information about the professionals searched by the present invention

FIG. 6C depicts a webpage 604 showing more detailed information about the professionals searched by the present invention. The information includes, but is not limited to, the professionals' specialty and contact information.

It should also be appreciated that, in addition to the "Search for Site Selectors" tool shown in FIGS. 6A-6C, a "Search for Economic Developers" tool may similarly be implemented. Within such embodiment, users may search for economic developers based on geography, type of organization and keywords, wherein contact information for these economic developers can be found either through the "Search for Economic Developer" portion of the website and/or as a hyperlink if, through the "Search for Community by Characteristics" portion of the website, their community is a matching community (e.g. by providing a hyperlink in the matching communities display). It should be further appreciated that, for some embodiments, an economic developer may be required to pay in order to be listed on the website.

Figure 7A:
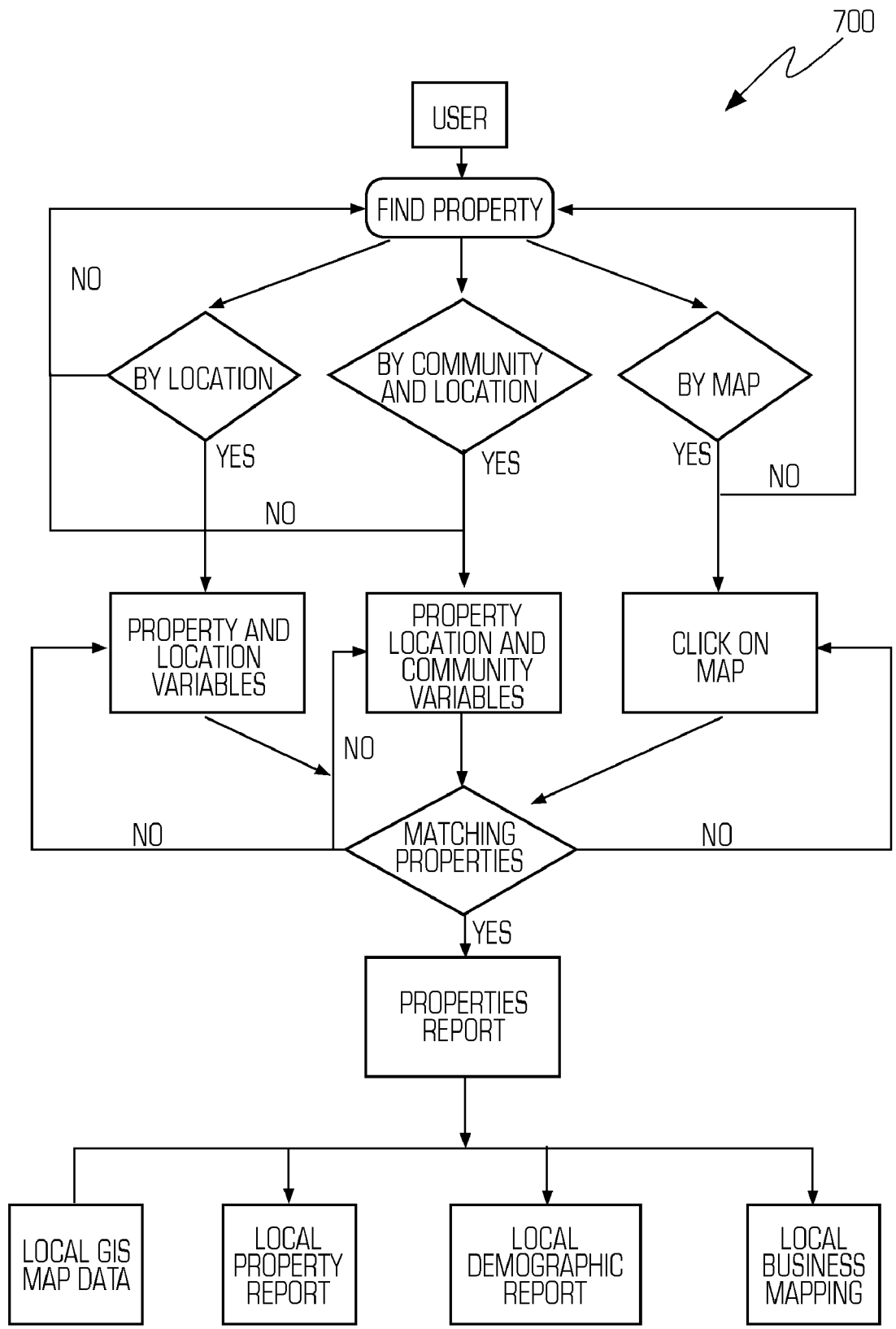
FIG. 7A depicts the steps to search properties of interest according to the present invention.

FIG. 7A depicts a method 700 using a web-based interactive Internet GIS mapping technology to search properties of interest according to the present invention. The method comprises the following steps: a user connects to the interactive Internet provided by the present invention; the user selects find property; the user selects a search criteria by location, by community and location, and by map; if the user is satisfied with the selection, the user selects variables given under each selection criteria. If not satisfied with the selection, the user goes back to the beginning and makes another attempt; said interactive Internet generates a list of matching properties. If the user is satisfied with the results, he/she se selects a property of interest from the list and said interactive Internet produces various search reports including local GIS map data, local property report, local demographic report, and local business mapping. If the user is not satisfied with the search results, he/she goes back to the previous step to enter/select new variables, and a new matching properties report is generated.

Figure 7B:
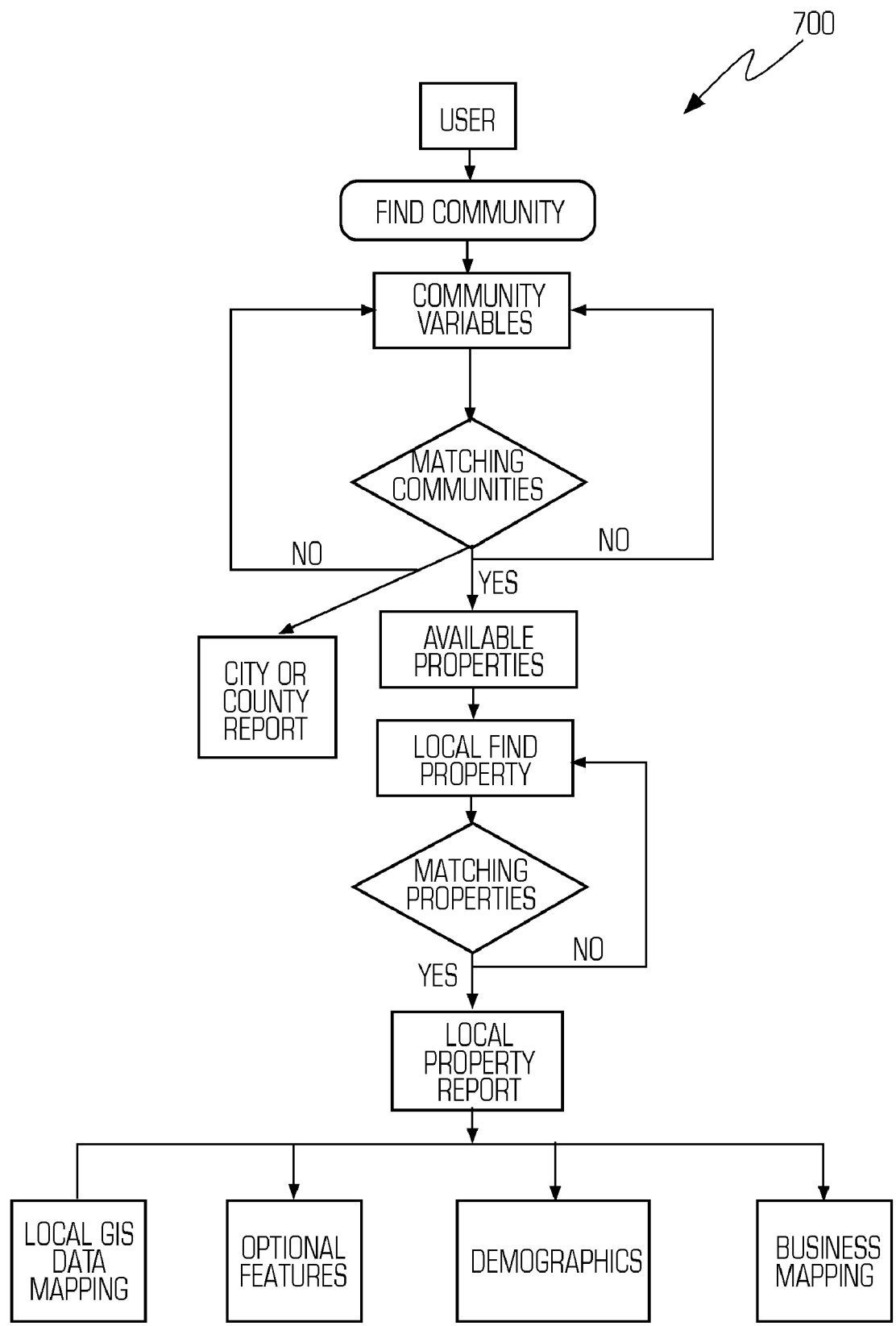
FIG. 7B depicts the steps to search communities of interest according to the present invention.

FIG. 7B depicts a method 702 using a web-based interactive Internet GIS mapping technology to search communities of interest according to the present invention. The method comprises the following steps: a user connects to the interactive Internet provided by the present invention; the user selects find community; the user selects community variables; a list of matching communities is generated. If satisfied, the user views city or county report as well as a list of available properties. If unsatisfied with the of matching communities, the user goes back to the previous step to change variables; the user selects local find property; a list of matching properties is generated; if satisfied, the user selects a local property report. If unsatisfied, the user goes back to the local find property and repeats the process; and said interactive Internet produces various search reports including local GIS map data, optional features, local demographic report, and local business mapping.

Figure 7C:
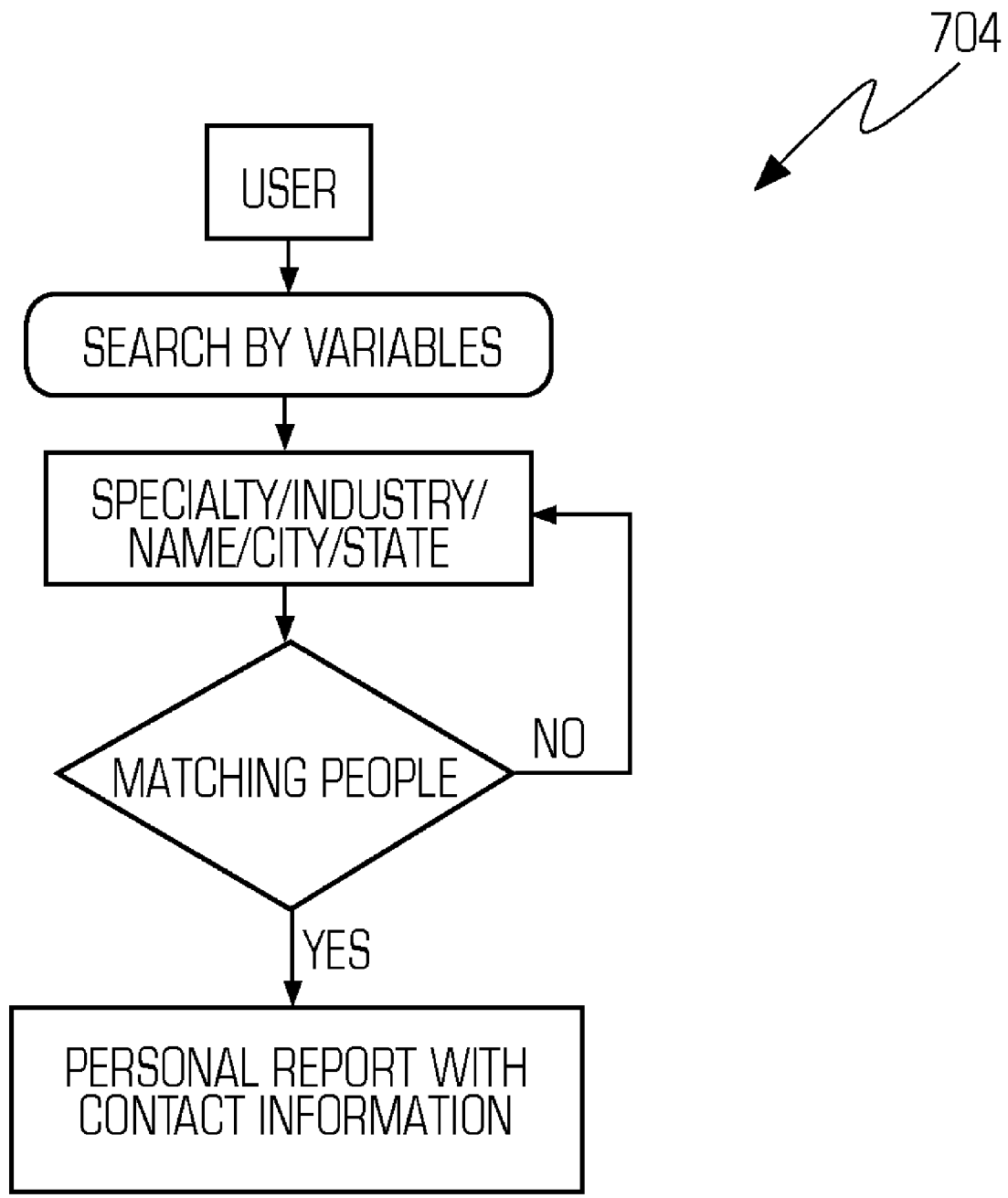
FIG. 7C depicts the steps to search site selection experts according to the present invention.

FIG. 7C depicts a method 704 using a web-based interactive Internet GIS mapping technology to search site selectors according to the present invention. The method comprises the following steps: a user connects to the interactive Internet provided by the present invention; the user selects find site selection expert; the user selects search variables; a search by specialty, industry, name, city or State is made available; and a list of matching people is generated. If satisfied, the user views a personal report with contact information. If unsatisfied, the user goes back to the previous step to find a different list of matching people.

Figure 8:
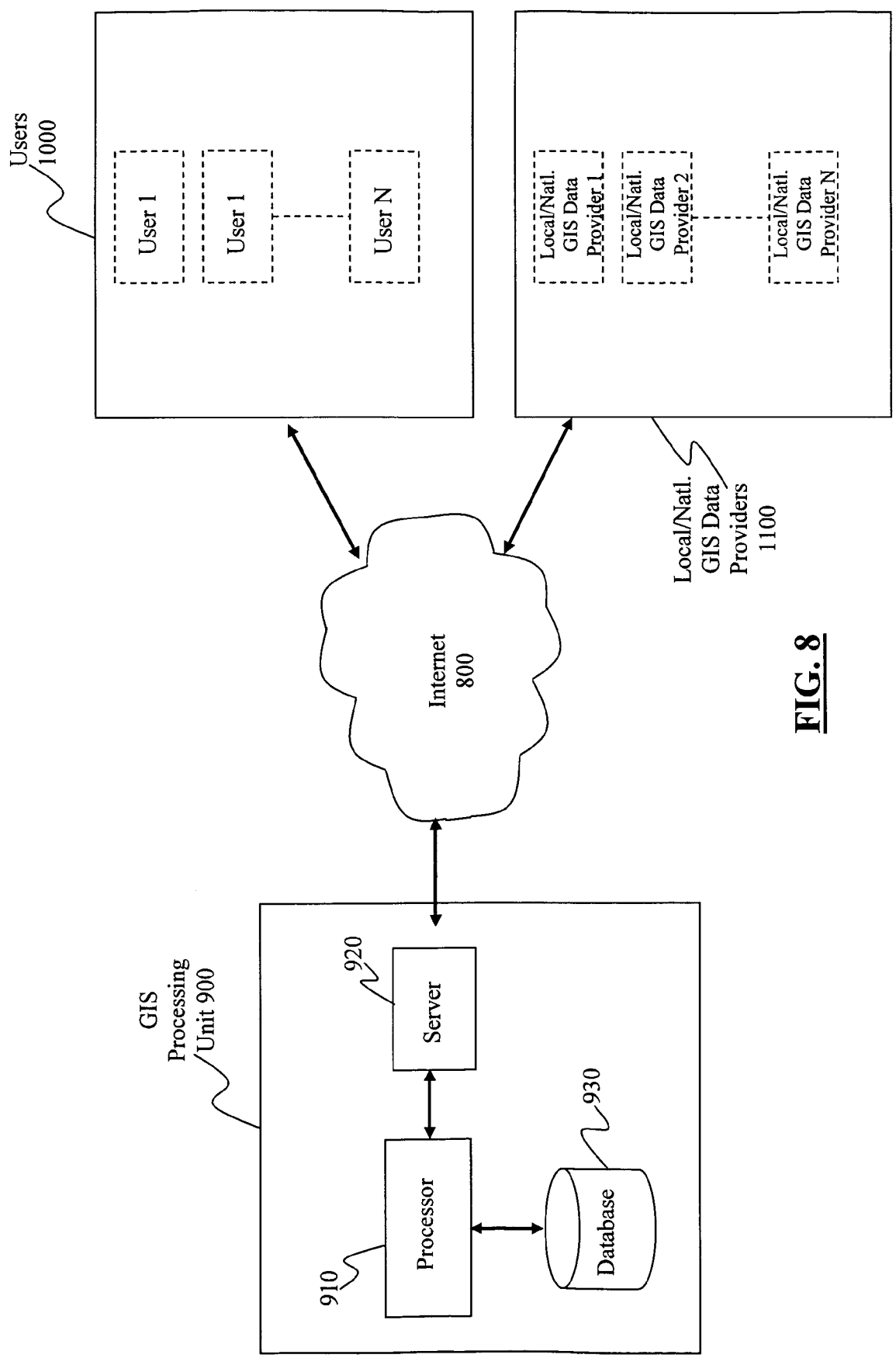
FIG. 8 is a block diagram of an interactive web-based system according to an embodiment of the present invention.

In FIG. 8, an embodiment of a system in accordance with the present invention is provided. Within this embodiment, a GIS processing unit 900 comprises a processor 910 coupled to database 930 and server 920, as shown. In a preferred embodiment, GIS processing unit 900 performs various functions and is coupled to users 1000 and a plurality of websites 1100 via a communications network 800 such as the Internet. Namely, server 920 and a data management application executed via processor 910 operate to provide various functions disclosed by the present invention.

In one embodiment, GIS processing unit 900 performs the function of receiving GIS data from plurality of websites 1100. GIS data received from such websites may include various distinct types of GIS data pertaining to particular geographic areas, including data pertaining to property availability, incentive zones, traffic flow, utilities, amenities, zoning, etc. Because such data may not necessarily reside on a single website, data is preferably received from a plurality of different websites. For example, property availability data may be received from a local realtor website, traffic flow data may be received from a national department of transportation website, and zoning data may be received from a county government website. It should also be appreciated that, because of the vast amount of GIS data available over the Internet, the scalability of database 930 is preferably flexible.

Another function preferably performed by GIS processing unit 900 includes inputting the gathered GIS data into a searchable database 930. Namely, such a function would preferably populate searchable database 930 with GIS data received from plurality of websites 1100, so as to allow users 1000 to access this data via a search mechanism. For some embodiments, such a search mechanism may comprise a weighted match algorithm to calculate communities that are lower than a 100% match and to prioritize particular search variables. Other embodiments may also include a search wizard (e.g., a search template comprising a series of questions) to help lay-users identify geographical characteristics of particular importance, wherein a weighted algorithm would then convert these answers into optimal location options.

GIS processing unit 900 also preferably performs the function of generating a search-specific electronic summary. In a preferred embodiment, a search-specific electronic summary may include any of a plurality of GIS data combinations, wherein the electronic summary may further include hyperlinks and/or tools to generate further electronic summaries. Such a feature is advantageous for several applications, including "economic gardening" applications which allow companies to ascertain community-specific assessments of how to improve their business via a single integrated data source (wherein the data source may include an integration of extensive data obtained from various databases, as well as different types of market and GIS analyses).

The electronic summary generated by GIS processing unit 900 may also include an interface which allows users 1000 to create a report of customized metrics according to particular GIS data combinations. Within such embodiment, it should be appreciated that any of a plurality of computational operations may be used to create these metrics. To facilitate the creation of such metrics, a weighted algorithm and/or search wizard, as discussed previously, may be implemented in order to help prioritize GIS data of particular importance to a user. One user may, for example, combine local GIS data pertaining to acres of vacant land parcels with national GIS data pertaining to per county population to create an "acres of vacant land parcels per capita" ratio, whereas another user may choose an operation that creates an entirely different type of metric (e.g., multiplying these two datasets according to a normalized value for each entry). Other users, meanwhile, may choose to introduce a third type of GIS data for cross-referencing purposes (e.g., returning only properties located within particular zoning areas) and/or to create another metric (e.g., creating a metric that is a function of acres of vacant land parcels, county population, and median household income).

In another embodiment, the electronic summary generated by GIS processing unit 900 includes a superimposition of GIS data onto a map. Within such embodiment, it should be appreciated that, because searchable database 930 preferably includes various types of GIS data received from various data sources, the present invention allows for the superimposition of various GIS data combinations onto a map. Such superimpositions may, for example, include combinations of different types of GIS data (e.g., zoning data and traffic flow data) and/or combinations of similar types of GIS data received from different websites (e.g., county X zoning data from a county X website along with county Y zoning data from a county Y website). It should also be appreciated that, because searchable database 930 may be populated by various types of maps (e.g., maps provided by Google, Yahoo, MS Live, ZoomProspector, etc.), other embodiments may include a map selection feature, wherein users 1000 may superimpose their particular GIS data combinations onto interchangeable maps.

Other embodiments of the present invention may also include which allows for a thematic mapping of GIS data. Within such embodiment, "heat maps" are generated which show concentrations of particular types of GIS data and/or data combinations by geography. To highlight these concentrations, a color scheme may, for example, be implemented, wherein each of the various colors may represent a range of values for the particular data and/or data combinations selected. Here, it should be appreciated that such values may represent customized metric values, as discussed previously. It should also be appreciated that, because searchable database 930 may include any combination of local and/or national GIS data, the particular data combinations used to generate heat maps may similarly include any combination of local and/or national GIS data (e.g., local data pertaining to acres of vacant land parcels may be combined with national data pertaining to per county population). Accordingly, the present invention provides a powerful tool in which the particular GIS data combinations most important to a user may be geographically highlighted instantly.

In another embodiment of the present invention, a method for networking users of a GIS data management system is provided. Within such embodiment, the method includes a first step of populating searchable database 930 with GIS data received from plurality of websites 1100, and a second step of providing a networking interface interoperable with database 930, wherein users 1000 of the GIS data management system are networked according to GIS data queries.

It should be appreciated that such a method for networking users of a GIS data management system may include several additional features. In one embodiment, for example, users 1000 may provide user-specific data that may be superimposed onto a map interface having particular geographical boundaries. Such a feature may be desirable for users 1000 wanting to advertise their business to other users 1000 who access maps having particular geographical boundaries. A restaurant owner, for example, may want to highlight the location of his/her restaurant onto a map to all users who zoom into a map having a particular proximity to where his/her restaurant is located. In one embodiment, the advertisement data may be superimposed onto a particular location on the map interface (e.g., a location on the map consistent with where the restaurant located) and may include a hyperlink to further user-specific data (e.g., videos, documents, virtual tours, etc.).

It should be further appreciated that the networking interface of this networking method may also include additional features. The interface may, for example, further include a proposal generator application which allows users 1000 to create custom proposals for businesses and/or a website development tool which enables users 1000 to create a custom website. The networking interface may also provide access to online communities maintained by the GIS data management system (e.g., community-specific calendars, training seminars, conferences, meetings, etc.).

It must be noted that as used herein and in the appended claims, the singular forms "a", "and", and "the" include plural referents unless the context clearly dictates otherwise. Thus, for example, reference to "a webpage" includes a plurality of such websites and reference to "an interactive GIS mapping technology" includes systems comprising a webpage, a database, layers of GIS information and the site-specific power of GIS through the Internet.

Unless defined otherwise, all technical and/or scientific terms used herein have the same meaning as commonly understood to one of ordinary skill in the art to which this invention belongs. Although any methods, technologies and systems similar or equivalent to those described herein can be used in the practice or testing of the invention, the preferred methods, systems and technologies are now described herein.

The present invention provides applicability to various industries. For instance, government-related industries are benefited by the present invention. In this regard, a GIS website designed to implement public safety is disclosed. For instance, information related to Megan's Law sex-offenders is accessible through the GIS website. In another embodiment, a GIS website designed to implement public health is disclosed. For instance, information related to diabetes, obesity and child development is accessible through the GIS website. Yet in another embodiment, a GIS website designed to implement workforce training is disclosed. Information related to training for the unemployed and underemployed is accessible through the GIS website. In one embodiment, a GIS website designed to implement tourism is disclosed. Information related to promoting the tourism industry utilizing virtual reality tours is accessible through the GIS website. In one embodiment, a GIS website designed to implement traffic/transportation is disclosed. Information related to the impact of traffic on construction and repairs is accessible through the GIS website. In one embodiment, a GIS website designed to implement small business promotion is disclosed. Information related to the promotion of local businesses and directing consumers to the businesses' services and offerings is accessible through the GIS website. In one embodiment, a GIS website designed to implement city planning is disclosed. Information related to local GIS data from city planning departments such as property information, land use, parcel sizes, etc. is accessible through the GIS website. In one embodiment, a GIS website designed to implement permit tracking is disclosed. Information related to the status of a permit in a municipal government is accessible through the website.

The present invention further provides applications in real estate related industries. By way of example, but not by way of limitation, the present invention includes the following applications: residential real estate; commercial real estate services to national commercial real estate companies; title insurance business; insurance businesses relative to geographic location; environmental development and analysis based on local GIS data and real estate information; online real estate search; and transaction assistance related to site selection analysis and property sale/lease.

All prior art mentioned herein are incorporated herein by reference for the purpose of describing, disclosing, and/or contrasting the technologies and information which are described in the prior art which might be used in connection with the presently described invention. The prior art discussed herein are provided solely for their disclosure prior to the filing date of the present application. Nothing herein is to be construed as an admission that the invention is not entitled to antedate such a disclosure by virtue of prior invention.

Although the foregoing invention has been described in some detail by way of illustration and example for purposes of clarity and understanding, it will be apparent to those skilled in the art that certain changes and modifications may be practiced. Various aspects of the invention have been achieved by a series of experiments, some of which are described by way of the following non-limiting examples. Therefore, the description and examples should not be construed as limiting the scope of the invention, which is delineated by the appended description of exemplary embodiments.

What is claimed is:

1. A method for providing geographic information systems (GIS) data, comprising:
   receiving, on a GIS processing unit, GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;
   populating a searchable database of the GIS processing unit with said GIS data, business data, industry data and demographics data;
   generating, using the GIS processing unit, a search-specific electronic summary of GIS data wherein said electronic summary comprises a superimposition of GIS data onto a map; and
   wherein said superimposition of GIS data comprises at least two distinct types of GIS data.

2. A method for providing geographic information systems (GIS) data, comprising:
   receiving, on a GIS processing unit, GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;
   populating a searchable database of the GIS processing unit with said GIS data, business data, industry data and demographics data;
   generating, using the GIS processing unit, a search-specific electronic summary of GIS data wherein said electronic summary comprises a superimposition of GIS data onto a map; and
   wherein said superimposition of GIS data comprises GIS data received from at least two distinct websites.

3. A method for providing geographic information systems (GIS) data, comprising:
   receiving, on a GIS processing unit, GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;
   populating a searchable database of the GIS processing unit with said GIS data, business data, industry data and demographics data;
   generating, using the GIS processing unit, a search-specific electronic summary of GIS data wherein said electronic summary comprises a superimposition of GIS data onto a map; and
   wherein said superimposition of GIS data creates a heat map.

4. A system for providing geographic information systems (GIS) data comprising:

a server connected to a computer network and a data management application executing in association with said server to provide the functions of:

receiving GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;

integrating said GIS data, business data, industry data and demographics data onto a searchable database;

displaying a search-specific electronic summary of GIS data, wherein said electronic summary comprises a superimposition of GIS data onto a map; and wherein said superimposition of GIS data comprises GIS data received from at least two distinct websites.

5. The system of claim 4 further comprising an interface for creating any of a plurality of metrics, wherein said metrics are a function of particular GIS data combinations.

6. The system of claim 5, wherein said electronic summary comprises a listing of said metrics.

7. The system of claim 5, wherein said electronic summary comprises a superimposition of said metrics onto a map.

8. A computer-readable storage medium having computer executable instructions executed by a GIS processing unit for providing geographic information systems (GIS) data wherein the computer executable instructions implement the method of:

integrating, on a GIS processing unit, GIS data received from a plurality of websites, business data, industry data and demographics data onto a searchable database of the GIS processing unit, the GIS data including one or more of property availability in a particular geographic area, incentive zones in the particular geographic area, traffic flow in the particular geographic area, utilities for the particular geographic area, amenities for the particular geographic area and zoning for the particular geographic area; and generating, using the GIS processing unit, a search-specific electronic summary of GIS data, wherein said electronic summary comprises a superimposition of GIS data onto a map; and wherein said superimposition of GIS data comprises GIS data received from at least two distinct websites.

9. The computer-readable storage medium of claim 8, wherein said map is selectable from a plurality of map types.

10. The computer-readable storage medium of claim 8 further comprising a search wizard to facilitate searches of said searchable database.

11. The computer-readable storage medium of claim 8, wherein said electronic summary comprises an identification of demographical clusters.

12. A method for networking users of a geographic information systems (GIS) data management system, comprising:

populating a searchable database with GIS data received from a plurality of websites;

providing a networking interface interoperable with said database, wherein said users of said GIS data management system are networked according to GIS data queries;

wherein said networking interface provides access to online communities maintained by said GIS data management system; and wherein users may provide user-specific data, and wherein said user-specific data is superimposed onto a map interface having particular geographical boundaries related to said user-specific data.

13. The method of claim 12, wherein said networking interface further comprises a proposal generator.

14. The method of claim 12, wherein said networking interface comprises a website development tool which enables said users to create a custom website.

15. A system for providing geographic information systems (GIS) data comprising:

a server connected to a computer network and a data management application executing in association with said server to provide the functions of:

receiving GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;

integrating said GIS data, business data, industry data and demographics data onto a searchable database;

displaying a search-specific electronic summary of GIS data, wherein said electronic summary comprises a superimposition of GIS data onto a map; and wherein said superimposition of GIS data comprises at least two distinct types of GIS data.

16. A system for providing geographic information systems (GIS) data comprising:

a server connected to a computer network and a data management application executing in association with said server to provide the functions of:

receiving GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;

integrating said GIS data, business data, industry data and demographics data onto a searchable database;

displaying a search-specific electronic summary of GIS data, wherein said electronic summary comprises a superimposition of GIS data onto a map; and wherein said superimposition of GIS data creates a heat map.

17. A computer-readable medium having computer executable instructions executed by a GIS processing unit for providing geographic information systems (GIS) data wherein the computer executable instructions implement the method of:

integrating, on a GIS processing unit, GIS data received from a plurality of websites, business data, industry data and demographics data onto a searchable database of the GIS processing unit, the GIS data including one or more of property availability in a particular geographic area, incentive zones in the particular geographic area, traffic flow in the particular geographic area, utilities for the particular geographic area, amenities for the particular geographic area and zoning for the particular geographic area;

generating, using the GIS processing unit, a search-specific electronic summary of GIS data, wherein said electronic summary comprises a superimposition of GIS data onto a map; and wherein said superimposition of GIS data comprises at least two distinct types of GIS data.

18. A computer-readable medium having computer executable instructions executed by a GIS processing unit for providing geographic information systems (GIS) data wherein the computer executable instructions implement the method of:
- integrating, on a GIS processing unit, GIS data received from a plurality of websites, business data, industry data and demographics data onto a searchable database of the GIS processing unit, the GIS data including one or more of property availability in a particular geographic area, incentive zones in the particular geographic area, traffic flow in the particular geographic area, utilities for the particular geographic area, amenities for the particular geographic area and zoning for the particular geographic area;
- generating, using the GIS processing unit, a search-specific electronic summary of GIS data, wherein said electronic summary comprises a superimposition of GIS data onto a map; and
- wherein said superimposition of GIS data creates a heat map.

19. A system for providing geographic information systems (GIS) data comprising:
- a server connected to a computer network and a data management application executing in association with said server to provide the functions of:
- receiving GIS data from a plurality of websites, the GIS data including one or more of property availability in a particular geographic area, incentive zones in the particular geographic area, traffic flow in the particular geographic area, utilities for the particular geographic area, amenities for the particular geographic area and zoning for the particular geographic area;
- integrating said GIS data, business data, industry data and demographics data onto a searchable database;
- displaying a search-specific electronic summary of GIS data;
- an interface for creating any of a plurality of metrics, wherein said metrics are a function of particular GIS data combinations; and
- wherein said electronic summary comprises a listing of said metrics.

* * * * *